United States Patent
Liebl

(10) Patent No.: US 8,867,659 B2
(45) Date of Patent: Oct. 21, 2014

(54) METHOD AND A DEVICE FOR TRANSMITTING AND RECEIVING SIGNALS WITH MODULATION COMPRESSION

(75) Inventor: Detlev Liebl, Fuerstenfeldbruck (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 238 days.

(21) Appl. No.: 12/824,392

(22) Filed: Jun. 28, 2010

(65) Prior Publication Data

US 2010/0329314 A1 Dec. 30, 2010

(30) Foreign Application Priority Data

Jun. 26, 2009 (DE) .......................... 10 2009 030 675

(51) Int. Cl.
| | |
|---|---|
| *H04L 25/03* | (2006.01) |
| *H04L 27/18* | (2006.01) |
| *H04L 27/20* | (2006.01) |
| *H04L 27/34* | (2006.01) |

(52) U.S. Cl.
CPC .......... *H04L 27/2067* (2013.01); *H04L 27/183* (2013.01); *H04L 27/3405* (2013.01)
USPC ........... 375/296; 375/261; 375/284; 375/285; 375/298; 375/308; 455/114.2

(58) Field of Classification Search
CPC ............ H04L 27/3405; H04L 27/3488; H04L 27/183; H04L 27/3411
USPC ......... 375/219, 260, 261, 279, 284, 285, 295, 375/296, 298, 308, 299; 455/114.2
See application file for complete search history.

(56) References Cited

U.S. PATENT DOCUMENTS

| | | | |
|---|---|---|---|
| 5,852,389 A | 12/1998 | Kumar et al. | |
| 5,991,337 A * | 11/1999 | Giles | 375/222 |
| 7,039,126 B2 * | 5/2006 | Galins | 375/298 |
| 7,394,865 B2 * | 7/2008 | Borran et al. | 375/295 |
| 8,270,525 B2 * | 9/2012 | Nakagawa et al. | 375/286 |
| 2006/0056541 A1 | 3/2006 | Chen et al. | |
| 2007/0297533 A1 * | 12/2007 | Chitrapu et al. | 375/308 |
| 2008/0170640 A1 | 7/2008 | Gao et al. | |
| 2009/0161786 A1 * | 6/2009 | Nakagawa et al. | 375/286 |

OTHER PUBLICATIONS

Wei et al. "Noncoherent Block-Coded QAM", Jun. 2007, IEEE, pp. 863-869.*
Robins "Signal Constellation Design Tool: A case Study in Sure Interface Synthesis", 1989, ICCAL, pp. 1-24.*

\* cited by examiner

*Primary Examiner* — Sophia Vlahos
(74) *Attorney, Agent, or Firm* — Ditthavong & Steiner, P.C.

(57) ABSTRACT

A communications device includes a transmitter, a transmission processing device, a receiver, and a reception processing device. The transmission processing device assigns signal-space points within an I/Q signal space to digital signals, which include data values. The reception processing device assigns data values to signal-space points. The transmitter generates a transmission signal from signal-space points to be transmitted. The receiver determines received signal-space points from a received signal. The individual transmitted and received signal-space points provide in each case a smaller spacing distance from adjacent signal-space points than from the origin of the signal space.

16 Claims, 9 Drawing Sheets

METHOD AND A DEVICE FOR TRANSMITTING AND RECEIVING SIGNALS WITH MODULATION COMPRESSION

CROSS-REFERENCE TO RELATED APPLICATION

The present application claims priority to German Application No. DE 10 2009 030 675.7, filed on Jun. 26, 2009, the entire contents of which are herein incorporated by reference.

FIELD OF THE INVENTION

The invention relates to a method and a device for transmitting and receiving signals.

BACKGROUND OF THE INVENTION

For the transmission of digital signals, individual data values are conventionally assigned to signal-space points within an I/Q signal space. If an interference of the transmission channel is based upon white noise, that is to say, the transmission channel is an AWGN (additive white Gaussian noise) channel, a maximum possible spacing distance between the signal-space points is advantageous for the avoidance of interference. One conventional transmission method is the 8-PSK method (phase-shift keying). In this context, as presented in FIG. 1, eight signal-space points are arranged on a unit circle around the origin of the signal space. A uniform spacing distance between adjacent signal-space points is obtained. However, only a few signal-space points can be accommodated.

For the more efficient exploitation of the signal space, with the equally widely used QAM method (quadrature-amplitude modulation), further signal-space points are inserted between the origin of the signal space and the signal-space points disposed further outwards. Accordingly, for example, with a 16-QAM method, 16 signal-space points are accommodated on a uniform square grid within the signal space. Accordingly, FIG. 2 shows a 16-QAM constellation diagram.

However, if the transmission channel is not an AWGN channel, and the noise provides a different power density distribution, these constellations prove disadvantageous. Transmission channels frequently provide a high noise power density with low amplitudes and a low noise power density at high amplitudes of the noise signal.

Regarding the prior art, reference is made by way of example to U.S. Pat. No. 5,852,389. However, in this context, no modulation compression is implemented, but rather a pre-distortion.

SUMMARY OF THE INVENTION

The invention advantageously provides a transmission method and a transmission device, which achieve high signal-noise ratios with a high noise-power density at low amplitudes.

A communications device according to the invention comprises a transmitter, a transmission processing device, a receiver and a reception processing device. The transmission processing device assigns signal-space points within an I/Q signal space to digital signals, which comprise data values. The reception processing device assigns signal-space points to data values. The transmitter generates a transmission signal from the signal-space points to be transmitted. The receiver determines received signal-space points from a received signal. The individual transmitted and received signal-space points each provide a relatively smaller spacing distance from adjacent signal-space points than from the origin of the signal space. Accordingly, high signal-noise ratios can be achieved even in the case of non-white noise.

The individual transmitted and received signal-space points preferably provide different spacing distances from the origin of the signal space. A large number of signal-space points can therefore be arranged within the signal space.

The communications device preferably contains a compression device and a decompression device. The compression device and the decompression device preferably displace signal-space points within the signal space. Accordingly, conventional constellation diagrams can be transformed at low cost into compressed constellation diagrams.

The compression device advantageously increases the spacing distance of signal-space points from the origin of the signal space. The decompression device advantageously reduces the spacing distance of signal-space points from the origin of the signal space. Accordingly, the sensitivity to noise signals of low amplitude is reduced.

The received and transmitted signal-space points preferably provide a uniform spacing distance from immediately adjacent signal-space points. Accordingly, an optimal distribution of the signal-space points within the signal space and therefore an efficient exploitation of the signal space is guaranteed.

By preference, the compression device adjusts the ratio of the spacing distance of signal-space points to be transmitted from the origin of the signal space and of the spacing distance of signal-space points from adjacent signal-space points dependent upon the distribution of the noise power. Accordingly, an optimal transmission is guaranteed with different distributions of the noise-power density.

By preference, the transmitted signal-space points correspond to the signal-space points assigned by the transmission processing device. The received signal-space points preferably correspond to the signal-space points assigned by the reception processing device. Accordingly, costly additional compression and decompression devices can be dispensed with.

The transmission processing device advantageously adjusts the ratio of the spacing distance of signal-space points to be transmitted from the origin of the signal space and of the spacing distance of the signal-space points from immediately adjacent signal-space points dependent upon the distribution of the noise power. Accordingly, an optimal transmission is guaranteed with different distributions of the noise power density.

BRIEF DESCRIPTION OF THE DRAWINGS

The invention is described by way of example on the basis of the drawings, in which advantageous exemplary embodiments of the invention are presented. The drawings are as follows.

DETAILED DESCRIPTION OF PREFERRED EMBODIMENTS

Figure 1:
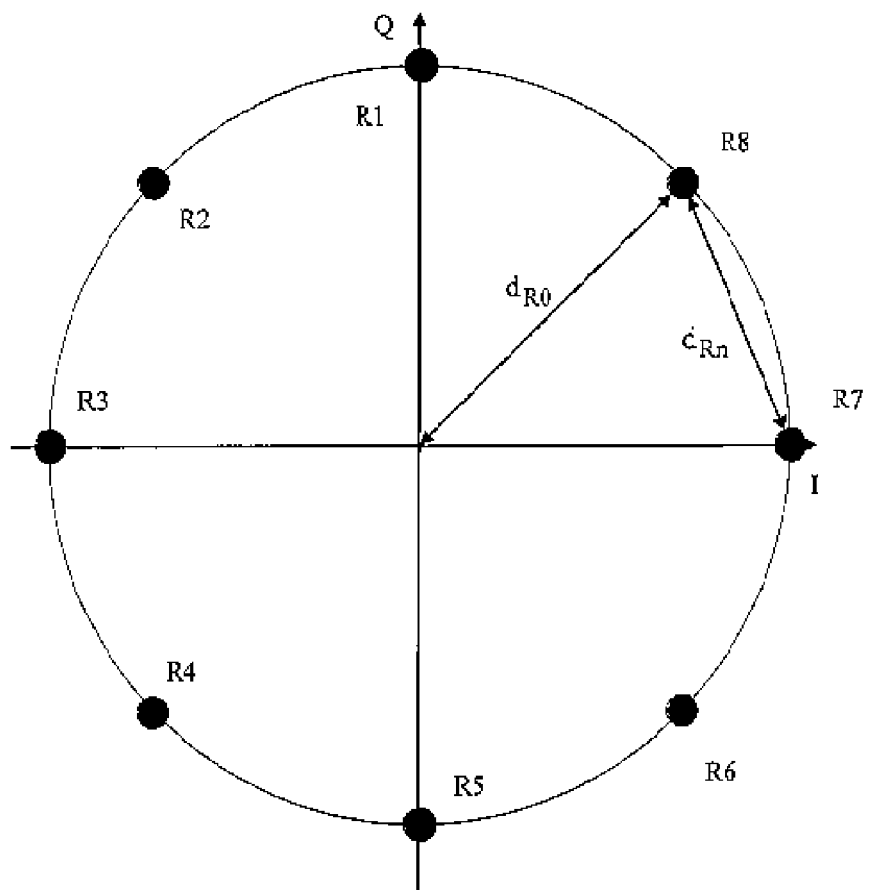
FIG. 1 shows a first exemplary constellation diagram.
Figure 2:
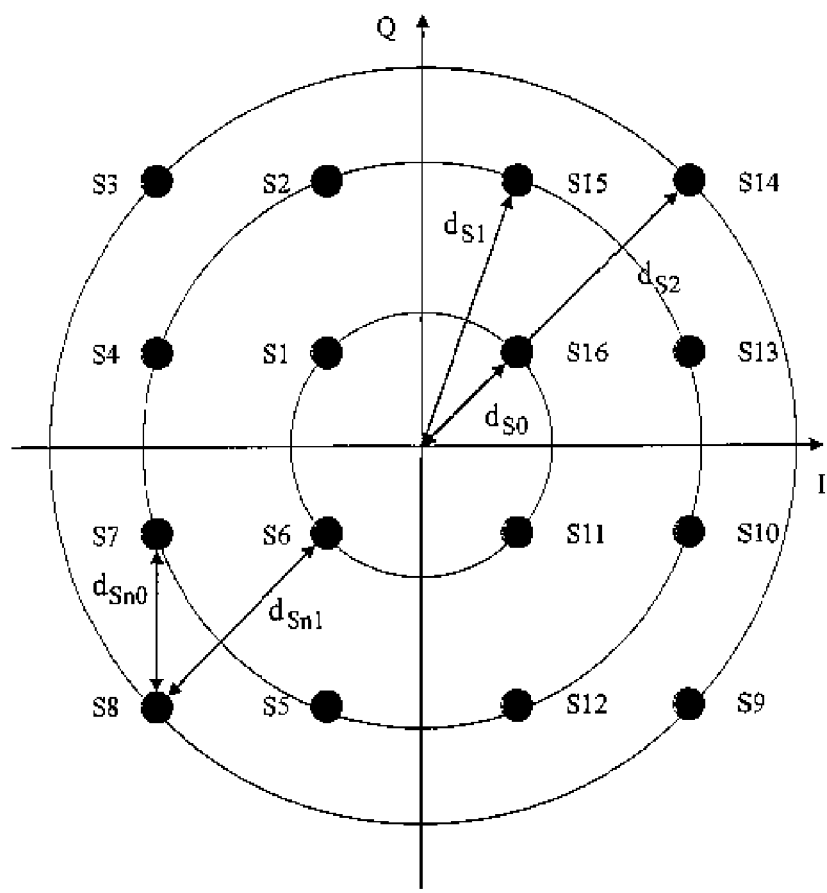
FIG. 2 shows a second exemplary constellation diagram.

The problem underlying the invention is initially presented on the basis of FIGS. 1-2. Following this, the functioning of the device according to the invention and of the method according to the invention are visualised with reference to two constellation diagrams on the basis of FIGS. 3-4. The structure and functioning of the device according to the invention are then further illustrated with reference to FIGS. 5-7. Finally, the functioning of the method according to the invention is explained in greater detail on the basis of FIGS. 8-11.

FIG. 1 shows the constellation diagram with an 8-PSK transmission. The signal-space points R1, R2, R3, R4, R5, R6, R7 and R8 are disposed on a unit circle about the origin of the signal space. Directly adjacent signal-space points in this context provide the spacing distance $d_{Rn}$. All signal-space points provide the spacing distance $d_{R0}$ from the origin of the signal space. The disadvantage with an 8-PSK transmission is that only 8 possible states, that is to say, 3 bits per symbol can be transmitted. However, at the same time, the large spacing distance $d_{R0}$ of the signal-space points from the origin of the signal space is advantageous.

To increase the number of bits per symbol, which can be transmitted with a technically meaningful, minimal inter-symbol spacing distance, additional signal-space points are inserted within a unit circle about the signal-space origin. A transmission method with a larger number of signal-space points is illustrated in FIG. 2.

FIG. 2 shows the constellation diagram of a 16-QAM transmission. By means of the signal-space points S1-S16, 16 different states, that is to say, 4 bits per symbol can be transmitted. In this context, the signal-space points S1, S6, S11 and S16 provide the spacing distance $d_{s0}$ from the origin of the signal space. The signal-space points S2, S4, S7, S5, S12, S10, S13 and S15 provide the spacing distance $d_{s1}$ from the origin of the signal space. The signal-space points S3, S8, S9 and S14 provide the spacing distance $d_{s2}$ from the origin of the signal space. The horizontal and respectively vertical spacing distance between directly adjacent signal-space points here is $d_{Sn0}$. The diagonal spacing distance between directly adjacent signal-space points here is $d_{Sn1}$.

For the classic 16-QAM modulation, the following coordinates and respectively radii apply for the signal-space points in the first quadrant:

|     | r     | I     | Q     |
| --- | ----- | ----- | ----- |
| S16 | 0.333 | 0.236 | 0.236 |
| S13 | 0.745 | 0.707 | 0.236 |
| S14 | 1.000 | 0.707 | 0.707 |
| S15 | 0.745 | 0.236 | 0.707 |

In this context r = SQRT (I * I + Q * Q)

With the 16-QAM transmission, a significantly larger number of states per symbol can be transmitted than with the 8-PSK transmission. However, the disadvantage here is that especially the signal-space points S1, S6, S11 and S16 provide only a very small spacing distance $d_{s0}$ from the origin of the signal space. In particular with transmission channels, which provide a very high noise-power density at low amplitudes, interference frequently occurs with these signal-space points. The signal-space points S2, S4, S7, S5, S12, S10, S13 and S15 already provide a larger spacing distance $d_{s1}$ and are therefore less sensitive to such interference. The signal-space points S3, S8, S9 and S14 provide the largest spacing distance $d_{s2}$ from the origin of the signal space and are therefore the least sensitive to the named type of interference.

Figure 3:
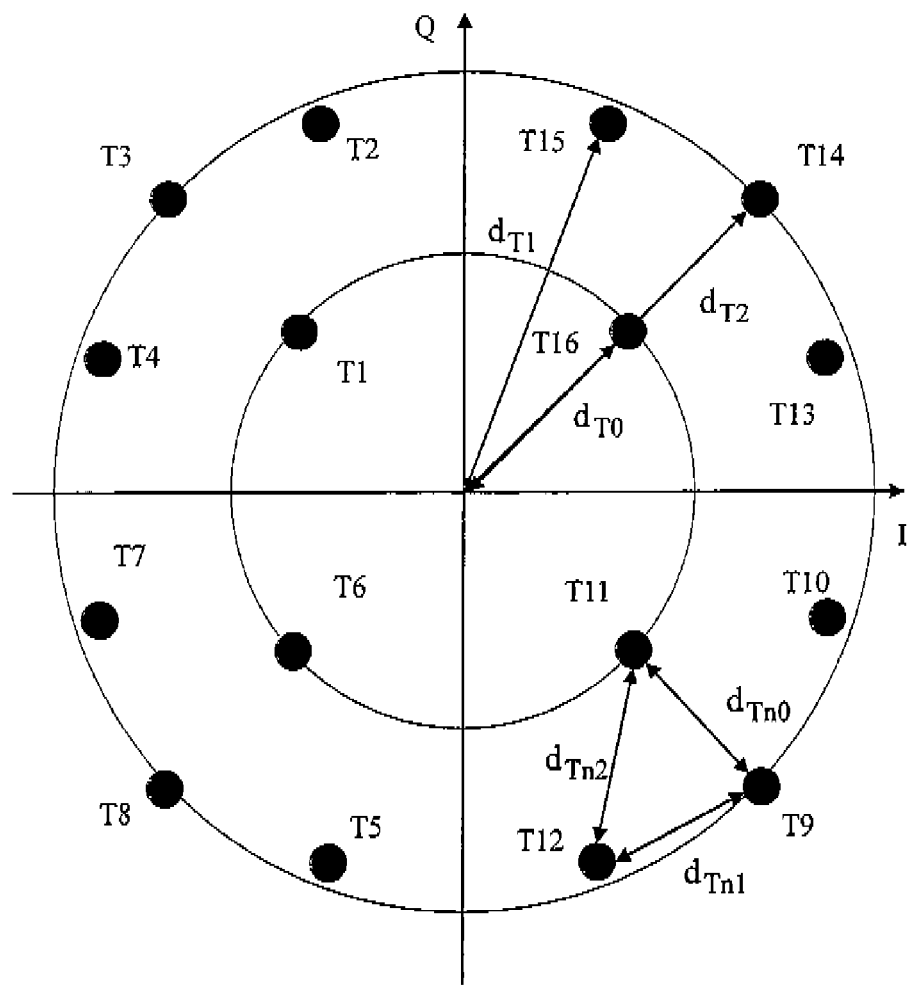
FIG. 3 shows a constellation diagram of a first exemplary embodiment of the device according to the invention.

FIG. 3 shows a constellation diagram in the case of a first transmission according to the invention. The signal-space points T1, T6, T11 and T16 are arranged on an inner circle about the origin of the signal space. They provide a spacing distance $d_{T0}$ from the origin of the signal space. The signal-space points T14, T3, T8, T9 are arranged on an outer circle about the origin of the signal space. They provide the spacing distance $d_{T2}$ from the origin of the signal space. The signal-space points T13, T15, T2, T4, T7, T5, T12, T10 are arranged on a middle circle about the origin. They provide the spacing distance $d_{T1}$ from the origin of the signal space. The spacing distance of the signal-space points on the inner circle and the middle circle is $d_{Tn2}$. The spacing distance of the signal-space points on the inner circle and the outer circle is $d_{Tn0}$. The spacing distance between the signal-space points on the outer circle and the middle circle is $d_{Tn1}$. The spacing distances $d_{Tn0}$, $d_{Tn1}$ and $d_{Tn2}$ in this context are approximately equal.

The following exemplary coordinates and respectively radii are obtained for the signal-space points in the first quadrant:

|     | r     | I     | Q     |
| --- | ----- | ----- | ----- |
| T16 | 0.533 | 0.377 | 0.377 |
| T13 | 0.859 | 0.794 | 0.329 |
| T14 | 1.000 | 0.707 | 0.707 |
| T15 | 0.859 | 0.323 | 0.794 |

In this context, r = SQRT (I * I + Q * Q)

The large spacing distance between the origin of the signal space and the inner circle is advantageous here. Even the signal-space points T1, T6, T11, T16 disposed nearest to the origin are less sensitive to noise of low amplitude.

The constellation diagram shown here is achieved by compression of a conventional 16-QAM constellation diagram. That is to say, the amplitude of signal-space points of low amplitude is increased. The higher the amplitude of the original signal-space points is, the smaller the increase in amplitude will be. The amplitude of signal-space points, which already provide a maximal amplitude, is not further increased. In this context, the angle of the signal-space points is not changed.

The implemented amplitude compression has been selected in such a manner that the same minimal inter-symbol spacing distance is observed as in the case of the classic 16-QAM modulation. As an alternative, a constellation, in which the spacing distance $d_{Tn0}$ is significantly smaller than the spacing distance $d_{Tn1}$, is also possible.

In this context, the size of the inner circle is determined dependent upon the power-density distribution of the noise power. If the focus of the noise-power density is at low amplitudes, a large inner circle is selected. With uniformly distributed noise-power density, a relatively smaller inner circle is selected. A constellation diagram of this kind is used by the device according to the invention, as presented in FIG. 5. Alternatively, this constellation diagram can also be used by a device according to the invention, as presented in FIG. 6.

Figure 4:
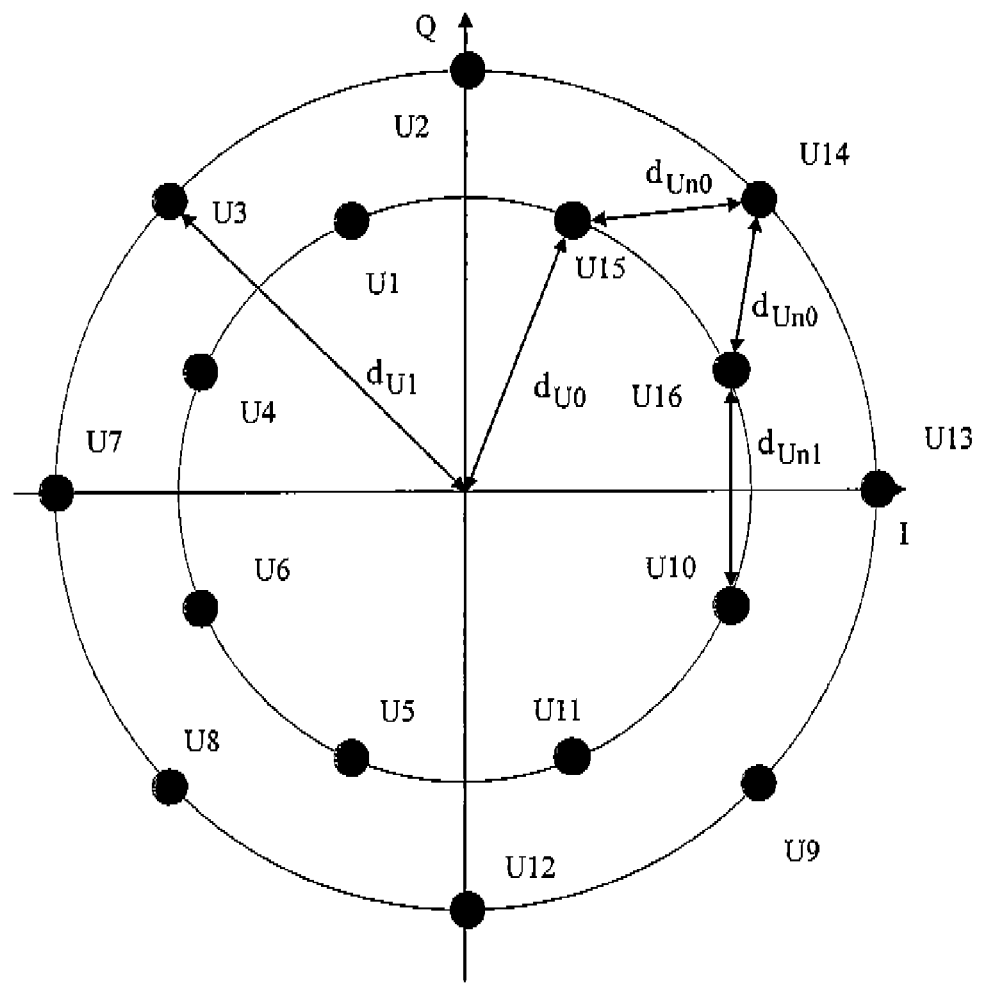
FIG. 4 shows a constellation diagram of a second exemplary embodiment of the device according to the invention.

FIG. 4 shows a second constellation diagram of a transmission according to the invention. Here also, the compression takes place in the I/Q signal plane. The inner signal-space points U1, U4, U6, U5, U11, U10, U16 and U15 here provide the spacing distance $d_{U0}$ from the origin of the signal space. The spacing distance $d_{U0}$ determines the sensitivity to noise with low amplitude. The signal-space points U2, U3, U7, U8, U12, U9, U13, U14 are disposed on an outer circle. They provide the spacing distance $d_{U1}$ from the origin of the signal space. The spacing distance $d_{U1}$ corresponds to a modulation of 100%. Signal-space points on the inner circle provide a spacing distance $d_{Un0}$ from signal-space points on the outer circle. The spacing distance between signal-space points on the inner circle is $d_{Un1}$.

This constellation diagram is determined in that the signal-space points within an annular area including the edges, which, through the unit circle externally and an internally disposed, concentric circle, which specifies a minimal spacing distance from the origin of the signal space, are distributed in such a manner that the spacing distances of adjacent signal-space points are maximised. In this context, the diameter of the unit circle corresponds to the maximal transmission power.

Numerical methods can be used for this purpose. With small numbers of signal-space points, an analytical solution is also possible. The size of the inner circle here is determined dependent upon the power-density distribution of the noise power. If the focus of the noise-power density is disposed at low amplitudes, a large inner circle is selected. With uniformly distributed noise power density, a relatively smaller inner circle is selected.

This constellation has been established, for example, subject to the specification to keep the same inter-symbol spacing distance $d_{Un0}$ as in the case of the classic 16-QAM modulation ($d_{Un0}$).

It is also advantageous here, that the inner circle already provides a large spacing distance $d_{U0}$ from the origin of the signal space. The signal-space points U1, U4, U6, U5, U11, U10, U16, U15 and especially the signal-space points U2, U3, U7, U8, U12, U9, U13 and U14 are therefore particularly insensitive to noise signals of low amplitudes. By comparison with pure amplitude compression according to FIG. 3, a significantly larger spacing distance of the inner signal-space points from the origin of the constellation diagram is achieved here.

The following coordinates are obtained here for the constellation diagram presented:

|     | r     | I     | Q     |
| --- | ----- | ----- | ----- |
| U16 | 0.649 | 0.600 | 0.248 |
| U15 | 0.649 | 0.248 | 0.600 |
| U13 | 1.000 | 1.000 | 0.000 |
| U14 | 1.000 | 0.707 | 0.707 |

In this context, r = SQRT (I * I + Q * Q)

Figure 5:
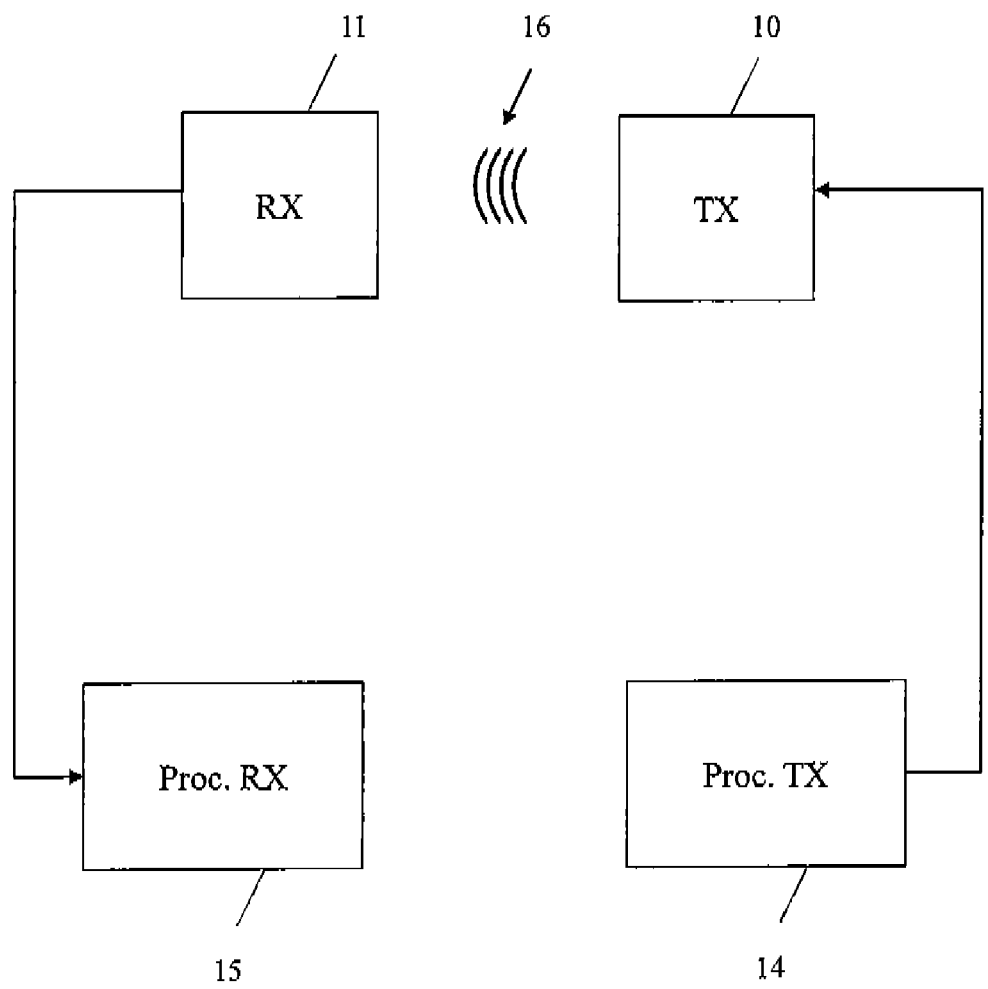
FIG. 5 shows a third exemplary embodiment of the device according to the invention.
Figure 6:
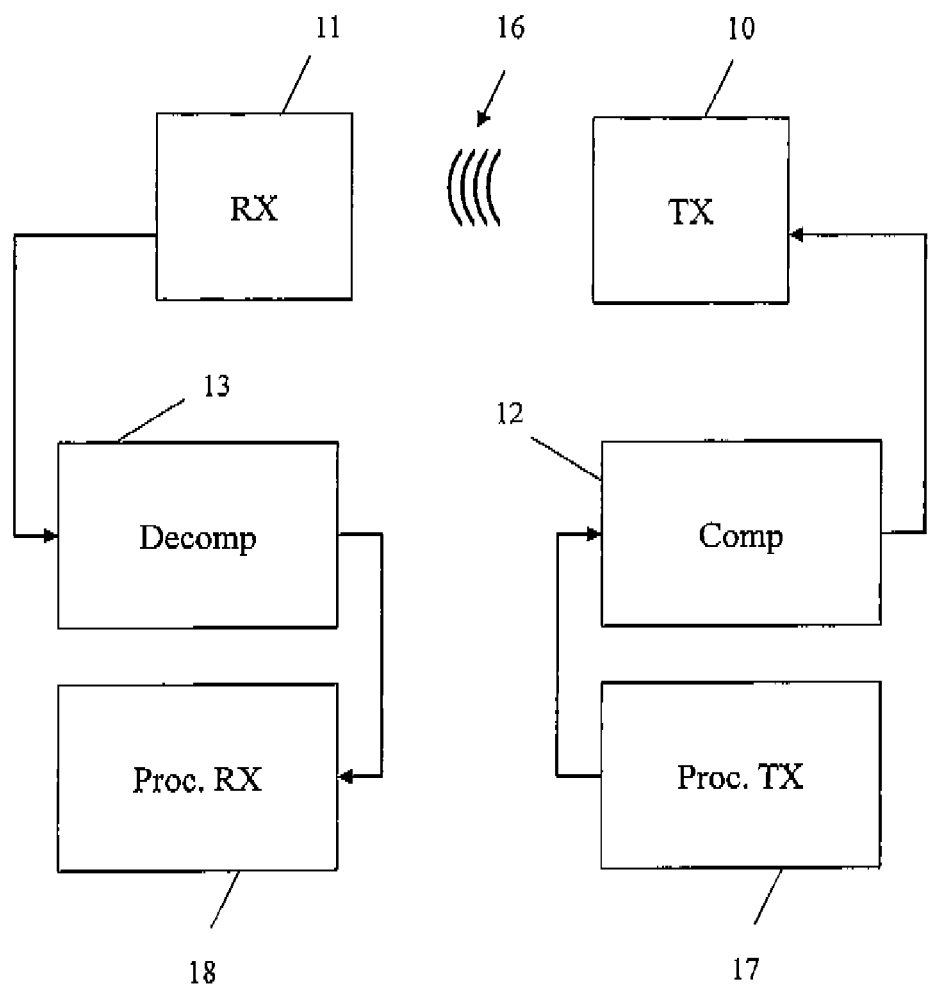
FIG. 6 shows a fourth exemplary embodiment of the device according to the invention.

A constellation diagram of this kind is used by a device according to the invention as presented in FIG. 5. As an alternative, it can also be used by a device according to the invention as shown in FIG. 6. In FIG. 5, a third exemplary embodiment of the device according to the invention is presented. A transmission processing device 14 is connected to a transmitter 10. A receiver 11 is connected to a reception processing device 15. From a digital signal, the transmission processing device 14 generates digital I/Q values, that is to say, signal-space points within a two-dimensional signal space. The signal-space points are transmitted to the transmitter 10 as digital data. The transmitter 10 generates a modulated transmission signal from the signal-space points and transmits this. It is transmitted via the transmission channel 16. The transmission channel 16 is a non-ideal transmission channel. That is to say, interference is superimposed on the modulated transmission signal.

The receiver 11 receives the disturbed, modulated transmission signal and transforms it into signal-space points. The signal-space points are transmitted as digital data to the reception processing device 15. The reception processing device 15 determines the digital signal starting from the signal-space points.

To ensure that the digital signal, which the transmission processing device 14 receives, is output by the reception processing device 15 in as identical a manner as possible, interference during the transmission must be avoided as far as possible. Real transmission channels are frequently not AWGN channels, that is to say, the channel interference is not white noise. With low amplitudes of the noise signal, a high noise-power density is often present, while a low noise-power density is present with high amplitudes of the noise signal. With such a transmission channel, non-optimal results may be obtained with conventional transmission methods, such as 16-QAM, because there is a high probability that signal-space points disposed close to the origin of the signal space are disturbed in such a manner that they are not transmitted correctly. In order to remove this problem, the transmission processing device 14 uses transmission methods, in which the signal-space points have a significantly larger spacing distance from the origin of the signal space than the spacing distance between the signal-space points. Accordingly, constellation diagrams of the signal-space points are used as shown in FIG. 3 and FIG. 4.

FIG. 6 shows a fourth exemplary embodiment of the device according to the invention. The exemplary embodiment corresponds in part to the exemplary embodiment illustrated in FIG. 5. A transmission processing device 17 is connected to a compression device 12. The compression device 12 is connected to a transmitter 10. A receiver 11 is connected to a decompression device 13. The decompression device 13 is connected to a reception processing device 18.

A digital signal is transformed by the transmission processing device 17 into I/Q values, that is to say, signal-space points within a two-dimensional signal space. In this context, conventional constellations of signal-space points are used, as shown, for example, in FIG. 1 or FIG. 2. The signal-space points are then transmitted as digital data to the compression device 12. The compression device 12 compresses the signal-space points towards higher amplitudes. That is to say, the spacing distance of the signal-space points from the origin of the signal space is increased. In this context, however, the maximal amplitude of the signal-space points is not changed. Accordingly, signal-space points, which already provide the maximal amplitude, are not changed. The minimal amplitude of the signal-space points is increased in this manner.

The transformation of the data into compressed signal-space points can also be implemented in one step, without generating conventional constellations.

The compressed signal-space points are then still transmitted as digital data to the transmitter 10. As already described with reference to FIG. 5, the transmitter 10 generates an analog signal from this and transmits it via the transmission channel 16 to the receiver 11. The receiver 11 regenerates the compressed signal-space points from this and reroutes them as digital data to the decompression device 13. The decompression device 13 reverses the compression by the compression device 12. That is to say, it reduces the minimal amplitude of the signal-space points. Accordingly, the conventional constellation diagram, which was transmitted by the transmission processing device 17 is regenerated and rerouted to the reception processing device 18. The reception processing device 18 regenerates a digital signal from the no-longer-compressed signal-space points.

The transformation of the compressed signal-space points into data can also be implemented in one step, without generating conventional constellations.

With this exemplary embodiment of the device according to the invention, it is advantageous that conventional transmission devices can be used according to the invention with the addition of only the compression device 12 and the decompression device 13.

Figure 7:
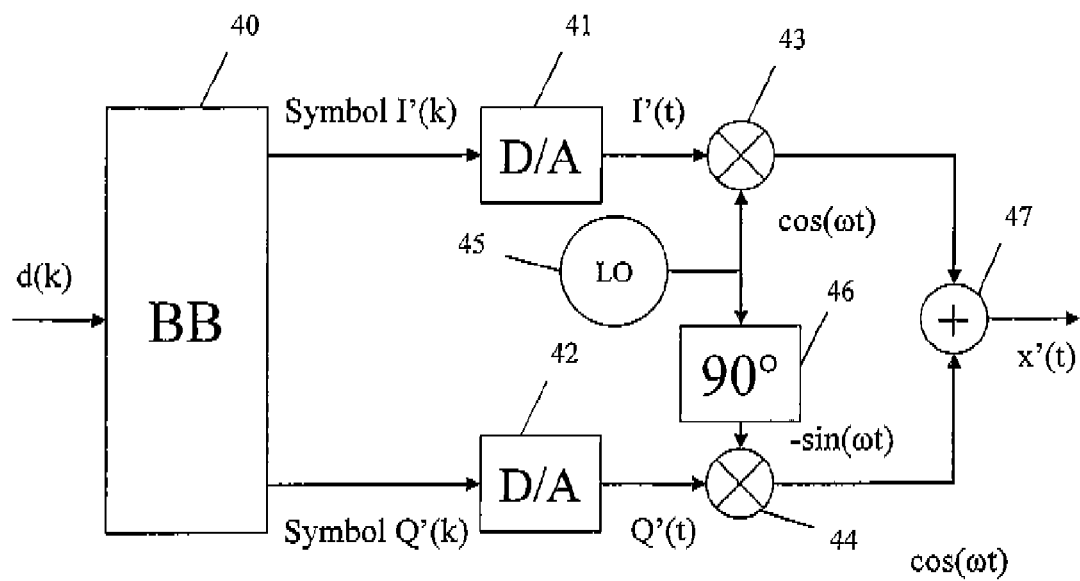
FIG. 7 shows a detail view of a fifth exemplary embodiment of the device according to the invention.

FIG. 7 shows a detail view of a part of a transmitter as it is also used in the exemplary embodiments from FIG. 5 and FIG. 6. A baseband processing device 40 is connected to two digital-analog converters 41, 42. The digital-analog converters 41, 42 are each connected to a mixer 43, 44. The first mixer 43 is still connected directly to a local oscillator 45. The second mixer 44 is connected via a phase shifter 46 to the local oscillator 45. The outputs of the mixers 43, 44 are connected to the inputs of an adder 47.

A digital signal d(k) is supplied to the baseband processing device 40. The baseband processing device 40 generates two digital signals I'(k) and Q'(k) from the digital signal d(k). The generated signals I'(k) and Q'(k) contain all of the information, which is contained in the digital signal d(k). The digital signal d(k) is accordingly converted into two-dimensional signal-space points. The signals I'(k) and Q'(k) are each supplied to a digital-analog converter 41, 42. The digital analog converters 41, 42 convert the signals I'(k) and Q'(k) into analog signals I'(t) and Q'(t). In order to transform the analog signals I'(t) and Q'(t) to a transmission frequency and combine them, they are each supplied to a mixer 43, 44. The first mixer 43 mixes the signal I'(t) directly with the local oscillator signal generated by the local oscillator 45. The second mixer 44 mixes the signal Q'(t) with a local oscillator signal delayed in its phase by 90° via the phase shifter 46. The signals generated by the mixers are combined by the adder 47 and output as the transmitted signal x'(t).

Figure 8:
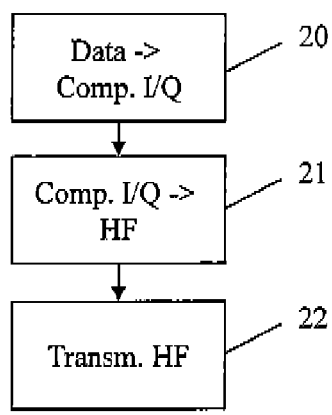
FIG. 8 shows a first detail view of a first exemplary embodiment of the method according to the invention.
Figure 9:
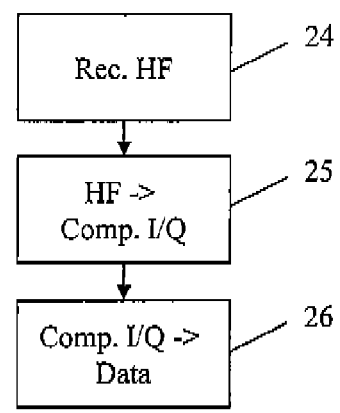
FIG. 9 shows a second detail view of a first exemplary embodiment of the method according to the invention.

FIG. 8 and FIG. 9 present a first exemplary embodiment of the method according to the invention. In a first step 20, digital data values are transformed directly into digital, compressed I/Q values. In a second step 21, an analog high-frequency signal is generated from the digital, compressed I/Q values. In a third step 22, the analog high-frequency signal is transmitted. In a fourth step 24, the transmitted high-frequency signal is received. In a fifth step 25, the digital, compressed I/Q values are determined from the received, analog high-frequency signal. In a final, sixth step 26, the data are recovered from the digital, compressed I/Q values, that is to say, the digital signal is reconstituted.

The method presented here is implemented, for example, by the exemplary embodiment of the device according to the invention from FIG. 5. Constellation diagrams as shown in FIG. 3 and FIG. 4 are used.

Figure 10:
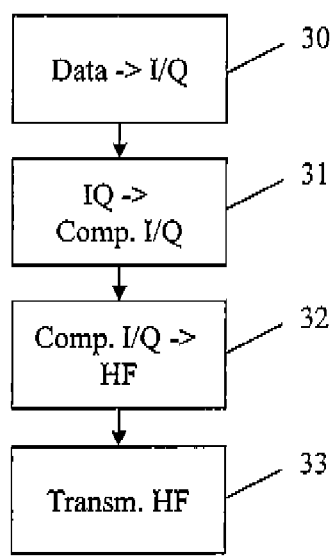
FIG. 10 shows a first detail view of a second exemplary embodiment of the method according to the invention.
Figure 11:
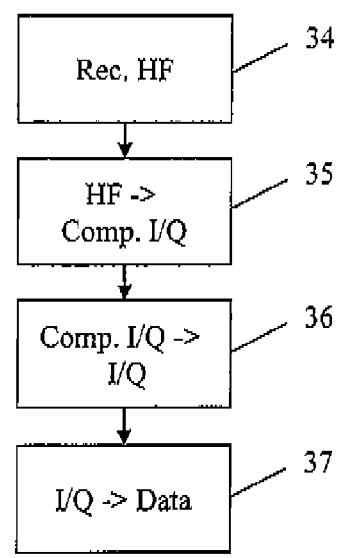
FIG. 11 shows a second detail view of a second exemplary embodiment of the method according to the invention.

A second exemplary embodiment of the method according to the invention is shown with reference to FIG. 10 and FIG. 11. This exemplary embodiment is used, if a classic QAM mapping occurs initially. In a first step 30, digital I/Q values are generated starting from a digital signal. In a second step 31, the digital I/Q values are compressed. For this purpose, the signal-space points are arranged within the signal space in such a manner that a compression is obtained. That is to say, I/Q values of low amplitude are increased in their amplitude. The exact procedure for the compression is described in greater detail with reference to FIG. 3. In a third step 32, an analog, high-frequency signal is generated from the compressed I/Q values. In a fourth step 33, the analog, high-frequency signal is transmitted. In a fifth step 34, the analog, high-frequency signal is received. In a sixth step 35, the digital, compressed I/Q values are recovered from the received analog, high-frequency signal. In a seventh step 36, the compression of the digital I/Q values is reversed. That is to say, the minimal amplitude of the I/Q values is reduced again. In this respect, reference is also made to the deliberations relating to FIG. 3 and FIG. 4. In a final, eighth step 37, the digital signal is recovered starting from the no longer compressed digital I/Q values.

The method presented here is implemented, for example, by the exemplary embodiment of the device according to the invention from FIG. 6. Constellation diagrams as shown in FIG. 3 and FIG. 4 are used.

The invention is not restricted to the exemplary embodiment illustrated. Accordingly, the compression of the constellation diagrams can be used with different, conventional transmission methods. A use with cable-bound transmission methods is also possible. All of the features described above or shown in the drawings can be advantageously combined with one another as required within the framework of the invention.

The invention claimed is:

1. A communications device comprising:
a transmitter;
a transmission processing device that generates signal-space points to be transmitted to the transmitter;
a receiver; and
a reception processing device, wherein
the transmission processing device assigns the signal-space points within an I/Q signal space having an origin to digital signals, which comprise data values, wherein the reception processing device assigns data values to the signal-space points,
the transmitter generates a transmission signal from the signal-space points, wherein the receiver determines received signal-space points from a reception signal,
the transmission processing device adjusts the ratio of the spacing distance of signal-space points to be transmitted from the origin of the signal space and of the spacing distance of the signal-space points from immediately adjacent signal-space points dependent upon the distribution of noise power,
wherein individual transmitted and received signal-space points provide a smaller spacing distance from adjacent signal-space points than from the origin of the original signal space, when a focus of noise-power density is at low amplitudes, and the transmitted and received signal-space points are arranged on an inner circle, a middle circle, and an outer circle about the origin of the signal-space providing an approximately equal spacing distance from immediately adjacent signal-space points.

2. The communications device according to claim 1, wherein the individual transmitted and received signal-space points arranged on each of the inner circle, the middle circle, and the outer circle provide different spacing distances from the origin of the signal space.

3. The communications device according to claim 1, wherein
the transmission processing device further comprises a compression device and the reception processing device further comprises a decompression device, and the compression device and the decompression device displace the signal-space points within the signal space.

4. The communications device according to claim 2, wherein
the transmission processing device further comprises a compression device and the reception processing device further comprises a decompression device, and
the compression device and the decompression device displace the signal-space points within the signal space.

5. The communications device according to claim 3, wherein
the compression device increases the spacing distance of signal-space points from the origin of the signal space, and
the decompression device reduces the spacing distance of signal-space points from the origin of the signal space.

6. The communications device according to claim 3, wherein
the compression device adjusts the ratio of the spacing distance of signal-space points to be transmitted from the origin of the signal space and of the spacing distance of the signal-space points from adjacent signal-space points dependent upon the distribution of the noise power.

7. The communications device according to claim 5, wherein
the compression device adjusts the ratio of the spacing distance of signal-space points to be transmitted from the origin of the signal space and of the spacing distance of the signal-space points from adjacent signal-space points dependent upon the distribution of the noise power.

8. The communications device according to claim 1, wherein
the transmitted signal-space points correspond to the signal-space points assigned by the transmission processing device, and
the received signal-space points correspond to the signal-space points assigned by the reception processing device.

9. A communications method for the transmission of messages, comprising:
assigning signal-space points within an I/Q signal space having an origin to digital signals;
assigning data values to the signal-space points;
generating a transmission signal from the signal-space points, wherein received signal-space points are determined from a reception signal;
adjusting the ratio of the spacing distance of signal-space points from the origin of the signal space and of the spacing distance of the signal-space points from immediately adjacent signal-space points dependent upon the distribution of noise power,
wherein individual transmitted and received signal-space points provide a smaller spacing distance from adjacent signal-space points than from the origin of the original signal space, when a focus of noise-power density is at low amplitudes; and
arranging the transmitted and received signal-space points on an inner circle, a middle circle, and an outer circle about the origin of the signal-space providing an approximately equal spacing distance from immediately adjacent signal-space points.

10. The communications method according to claim 9, wherein the individual transmitted and received signal-space points arranged on each of the inner circle, the middle circle, and the outer circle provide different spacing distances from the origin of the signal space.

11. The communications method according to claim 9, wherein
a compression and decompression of signal-space points is implemented, and
compression and decompression is implemented by displacement of signal-space points within the signal space.

12. The communications method according to claim 10, wherein
a compression and decompression of signal-space points is implemented, and
compression and decompression is implemented by displacement of signal-space points within the signal space.

13. The communications method according to claim 11, wherein,
in a case of compression, the spacing distance of signal-space points from the origin of the signal space is increased, and
in a case of decompression, the spacing distance of signal-space points from the origin of the signal space is reduced.

14. The communications method according to claim 11, wherein,
in a case of compression, the ratio of the spacing distance of signal-space points to be transmitted from the origin of the signal space and of the spacing distance of the signal-space points from adjacent signal-space points is adjusted dependent upon the distribution of the noise power.

15. The communications method according to claim 13, wherein,
in a case of compression, the ratio of the spacing distance of signal-space points to be transmitted from the origin of the signal space and of the spacing distance of the signal-space points from adjacent signal-space points is adjusted dependent upon the distribution of the noise power.

16. The communications method according to claim 9, wherein
the signal-space points to be transmitted correspond to originally assigned signal-space points, and
the received signal-space points correspond to the originally assigned signal-space points.

* * * * *